(12) United States Patent
Yellamraju et al.

(10) Patent No.: US 10,564,711 B2
(45) Date of Patent: *Feb. 18, 2020

(54) INTERACTIVE CONFERENCING SYSTEM (71) Applicant: Polycom, Inc., San Jose, CA (US)

(72) Inventors: SivaKiran Venkata Yellamraju, Santa Clara, CA (US); Tandav Krishna Sanka, Bangalore (IN)

(73) Assignee: Polycom, Inc., San Jose, CA (US)

( * ) Notice: Subject to any disclaimer, the term of this patent is extended or adjusted under 35 U.S.C. 154(b) by 314 days.

This patent is subject to a terminal disclaimer.

(21) Appl. No.: 15/783,942

(22) Filed: Oct. 13, 2017

(65) Prior Publication Data

US 2018/0041554 A1  Feb. 8, 2018

Related U.S. Application Data

(63) Continuation of application No. 13/911,233, filed on Jun. 6, 2013, now Pat. No. 9,826,006, which is a continuation of application No. 12/776,397, filed on May 9, 2010, now abandoned.

(60) Provisional application No. 61/176,880, filed on May 9, 2009.

(51) Int. Cl.
| | |
|---|---|
| *G06F 3/00* | (2006.01) |
| *G06F 3/01* | (2006.01) |
| *H04L 29/06* | (2006.01) |
| *H04L 29/08* | (2006.01) |

(52) U.S. Cl.
CPC ............ *G06F 3/01* (2013.01); *H04L 65/1069* (2013.01); *H04L 65/403* (2013.01); *H04L 65/4038* (2013.01); *H04L 67/303* (2013.01); *H04L 69/24* (2013.01)

(58) Field of Classification Search
CPC .............. H04L 65/403; H04L 65/1069; H04L 65/4038; H04L 67/303; H04L 69/24; G06F 3/01
See application file for complete search history.

(56) References Cited

U.S. PATENT DOCUMENTS

| | | |
|---|---|---|
| 6,237,025 B1 | 5/2001 | Ludwig et al. |
| 6,697,341 B1 | 2/2004 | Roy |

(Continued)

*Primary Examiner* — Kieu D Vu
*Assistant Examiner* — Asteway T Gattew
(74) *Attorney, Agent, or Firm* — Blank Rome, LLP (57) ABSTRACT

An interactive conferencing device enables conference participants to interact remotely through multiple multimedia channels based on the configured capabilities of participants. A system used by the conferencing device consists of a server and one or more client devices. On joining new interactive session, the attributes and capabilities of the participant are determined. Other participants are notified as to the attributes and capabilities of the new participant. The interaction between participants is determined by their attributes and capabilities and that of the participant they wish to interact with. Participants can use a client device to join a session. If the device is capable of rendering a graphical display based on the capability information configured for that participant and device, participants can view multiple views rendered for the session in different regions of a display. The participants may interact with members of the session they select based on their mutual configured capabilities.

18 Claims, 10 Drawing Sheets

(56) References Cited

U.S. PATENT DOCUMENTS

| | | | |
|---|---|---|---|
| 7,057,636 B1 * | 6/2006 | Cohen-Solal | G01S 3/7864 348/14.08 |
| 7,865,834 B1 * | 1/2011 | van Os | G09G 3/003 348/14.12 |
| 2003/0233416 A1 | 12/2003 | Beyda | |
| 2004/0002049 A1 | 1/2004 | Beavers et al. | |
| 2004/0030749 A1 | 2/2004 | Bowman-Amuah | |
| 2006/0294186 A1 | 12/2006 | Nguyen et al. | |
| 2007/0211141 A1 | 9/2007 | Christiansen | |
| 2009/0089683 A1 | 4/2009 | Thapa | |
| 2009/0112589 A1 | 4/2009 | Hiselius | |
| 2009/0146982 A1 * | 6/2009 | Thielman | H04N 7/15 345/207 |
| 2009/0183080 A1 | 7/2009 | Thakker et al. | |
| 2010/0037151 A1 | 2/2010 | Ackerman et al. | |
| 2011/0025819 A1 | 2/2011 | Gorzynski et al. | |

* cited by examiner

INTERACTIVE CONFERENCING SYSTEM

CROSS-REFERENCE TO RELATED APPLICATIONS

This application is a continuation of U.S. application Ser. No. 13/911,233 filed Jun. 6, 2013, which is a continuation of U.S. application Ser. No. 12/776,397 filed May 9, 2010, which claims priority to U.S. Provisional Application No. 61/176,880 filed May 9, 2009, entitled "Method and Apparatus for Capability-Based Multimedia Interactions". The entire contents of all of which are incorporated herein by reference for all purposes.

BACKGROUND OF INVENTION

1. Field of the Invention

This invention generally relates to enabling capability-based participation by two or more participants.

2. Background and Description of the Related Art

Interactions between remote participants can take many forms. It can be a planning meeting, a seminar, a classroom, or thousands of people watching a speech. In these interactions, people assume or may be assigned various roles. For instance, in a remote classroom environment, you have students, an instructor, possibly assistants to the instructor, and display of one or more multimedia presentations.

Interactions may be through multiple channels; a webinar, phone line, and TTY, but each would be limited to the set of capabilities associated with that channel and all users in that channel would be limited to those capabilities. For instance, all persons logged in through the web would be assumed to have the same capabilities.

In each of these roles, there may be different kinds of actions one can perform on people or objects in other roles. An instructor can start a public discussion with a selected student or group of students. A participant, not to disturb the rest of the class, could have a private conversation with another participant. A participant may wish to focus his attention on a multimedia presentation and not watch the presenter, or vice versa. The other streams will continue unabated, making this challenging for the participant to filter out these other distractions.

Multimedia presentations can be delivered to large groups of people for viewing and interaction using a variety of devices such as computers, cell phones, and PDA's. These devices, which we will collectively refer to as client devices, enable one or more persons to interact with various portions of the screen in a fixed manner. Such conferencing or other interactive software enable persons to receive fixed views of persons such that either the size of the entire display can be modified, or one can make portions larger or smaller. Doing the latter would cause the partial obliteration of the other portions of the display rather than resizing to fit.

Remote presentations impliedly create two roles; the presenter and the viewer. The presenter owns one or more windows associated. The presenter may temporarily or permanently promote one of the viewers to be the presenter.

SUMMARY

In one embodiment, a method for managing participant data to configure remote interactions with a plurality of participants using multiple multimedia streams over a network, the remote interactions determined by participant data associated with each of the plurality of participants is disclosed. A new participant is enabled to join an interactive session. The attributes and capabilities of the new participant are determined. Other participants are notified that the new participant has joined and what his attributes and capabilities are. A view of the participants is presented to the participant on a display.

In another embodiment, a method for enabling a user to configure a display consisting of one or more regions is disclosed. A region is selected to be modified. A command is sent to change the size or visibility of the selected region. The size or visibility of the selected region is modified. All other regions are resized to use the remaining space on the display.

In another embodiment, a presence server managing participant data to configure remote interactions with a plurality of participants multiple multimedia streams over a network, the remote interactions determined by participant data associated with each of the plurality of participants is disclosed. The apparatus includes a computer coupled to a network, storage for category, capability and profile information, storage for commands coupled to the computer, a presence notification manager, a client device handler, a session manager, a profile manager, a capability manager, and a status manager. The presence notification manager sends notifications to client devices that one or more participants have joined the session, left the session, or changed attributes, capabilities or status. The client device handler sends and receives messages from the client devices. The session manager manages the state of a session and list of participants associated with a session. The category manager manages how each client device may interact with the session. The profile manager manages a list of users and all attributes associated with that user. The capability manager determines what capabilities each client device and its associated user has. The status manager determines what the status of each client device and its associated user.

BRIEF DESCRIPTION OF THE DRAWINGS

A better understanding of the present invention can be obtained from the following detailed description in conjunction with the following drawings, in which.

Depending on the client device, a participant may have the capability to move, resize, or hide each tile.

The figures are provided in order to provide a thorough understanding of the present invention. The figures should not be construed as limiting the breath of the invention in any manner.

DETAILED DESCRIPTION

Figure 1:
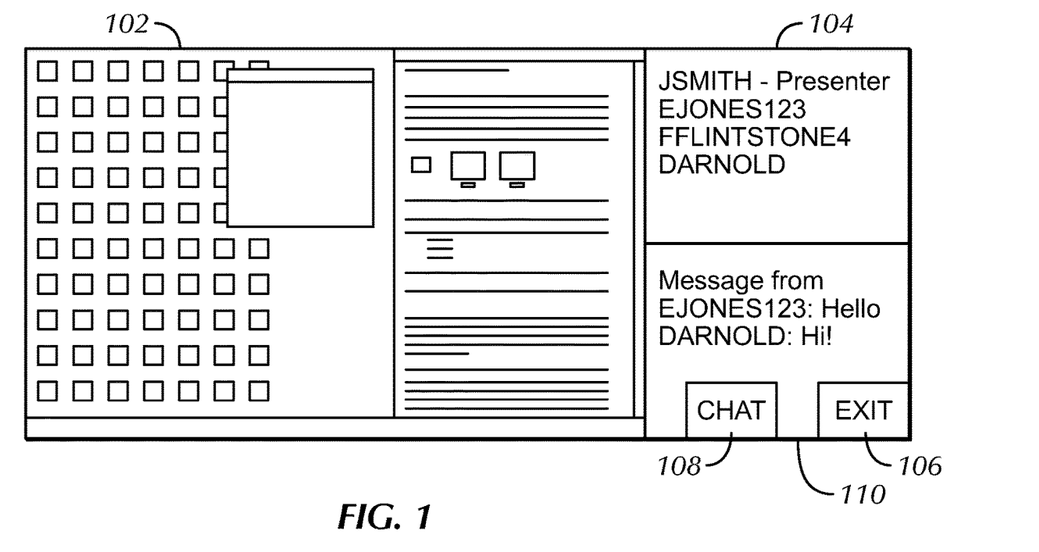
FIG. 1 illustrates the prior art.

FIG. 1 shows an example of the prior art consisting of a client-server application which displays to the client in a fixed format. The screen is divided into several rectangular regions 102, 104, 110. Each region contains a fixed output. These regions include information from the presenters desktop 102, a list of who is connected 104, and a region which allows users to exchange information via text chat 110. The list of persons who are connected 104 contain whatever identifier each user enters and perhaps some added text info that the user entered that further identifies them. There also maybe an indication of whether they are connected by phone or by internet. The application enables chat only to those users with internet capability.

The window containing the presenters desktop 110 may show the entire desktop or a specific application running on the desktop. The user has no control over the size of the display. Though the user has the capability of displaying more of the list and chat window, it is generally only to make it wider or narrower and the presenter's desktop display is either padded with space or clipped.

Figure 2:
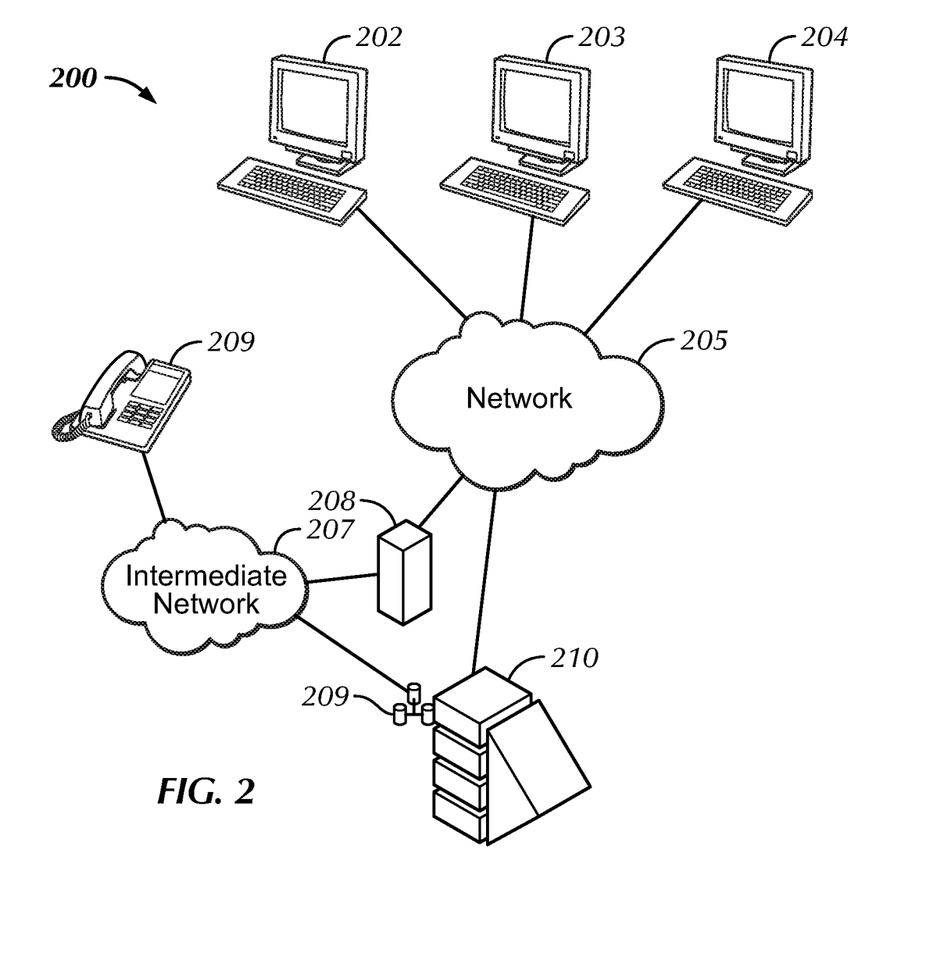
FIG. 2 illustrates the process of participant-based multimedia interactions in the prior art.

FIG. 2 illustrates one environment in which one or more embodiments of the invention may operate. However, not all of these components may be required to practice the invention, and variations in the arrangement and type of the components may be made without departing from the spirit or scope of the invention.

As shown in FIG. 2, system 200 includes internet client devices 202-204, a primary network 205, and a presence server 210. The primary network 205 is in communication with and enables communication between each of the internet client devices 202-204 and presence server 210. A non-internet client device 209 may also be connected via an intermediary network 207, such as a cellular or telephony network. The presence server 210 may then interconnect with this intermediary network 207 either indirectly via a gateway 208, or directly through its own interface 209.

Internet client devices 202-204 may include virtually any interactive device capable of receiving and sending messages over a network, such as the primary network 205 or an intermediary network 207, to and from another interactive device, such as the presence server 206, each other, and the like. Similarly, client devices 202-204 may be any device that is capable of connecting using a wired or wireless communication medium such as a PDA, POCKET PC, wearable computer, and any other device that is equipped to communicate over a wired and/or wireless communication medium.

In one or more embodiment, each internet client device within 202-204 may include a browser application that is configured to receive and to send web pages, and the like. The browser application may be configured to receive and display graphics, text, multimedia, and the like, employing virtually any web-based language, including but not limited to a Standard Generalized Markup Language (SGML), such as Hyper Text Markup Language (HTML), a wireless application protocol (WAP), a Handheld Device Markup Language (HDML) such as Wireless Markup Language (WML), WMLScript, JavaScript, and the like.

Internet client devices 202-204 may further be configured to receive a message from another computing device employing another mechanism, including but not limited to email, Short Message Service (SMS), Multimedia Message Service (MMS), instant messaging (IM), internet relay chat (IRC), mIRC, Jabber, and the like.

Internet client devices 202-204 may further be configured to enable a user to manage a user profile including one or more attributes of the user which may or may in turn be saved at the presence server 206 or a database. As such, internet client devices 202-204 may further include a client application that is configured to manage various actions on behalf of the client device. For example, the client application may enable a user to interact with the browser application, email application, and the like, to customize how another user might view a persona, profile or the like associated with the user. For example, the user may employ the client application, in part, to provide a picture to be displayed to another user connected to the presence server 210 representing that user when that user is connected to the presence server 210 when both users are interacting as part of a meeting, seminar, class, or the like, through the presence server 210.

The primary network 205 is configured to couple one interactive device to another interactive device to enable them to communicate. The primary network 205 is enabled to employ any form of computer readable media for communicating information from one electronic device to another. The primary network 205 may include a wireless interface, and/or a wired interface, such as the Internet, in addition to local area networks (LANs), wide area networks (WANs), direct connections such as through a universal serial bus (USB) port, other forms of computer-readable media, or any combination thereof.

The set of non-internet client devices 209 may include devices that typically connect using a wired communications medium such as button or rotary telephones, personal computers, multiprocessor systems, microprocessor-based or programmable consumer electronics, network PCs and the like. The set of such devices may also include devices that typically connect using a wireless communications network such as cell phones, smart phones, pagers, walkie-talkies, radio frequency (RF) devices, infrared (IR) devices, Citizen Band (CB) radios, integrated devices combining one or more of the preceding devices, or virtually any mobile device, and the like.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The term "modulated data signal" and "carrier-wave signal" includes a signal that has one or more of its characteristics set or changed in such a manner as to encode information, instructions, data, and the like, in the signal.

One embodiment of the presence server 210 is described in more detail below in conjunction with FIG. 3. Briefly, however, the presence server 210 may include any computing device capable of connecting to the primary network 205 to manage one or more interactions with two or more users, such as users of at least one of the internet client devices 202-204. Devices that may operate as the presence server 210 include personal computers, multiprocessor systems, servers, and the like.

The presence server may be configured to receive information associated with a non-internet client devices 209 and/or the internet client devices 202-204, and to enable a user to customize a view based in part on the received information. The received information may include, but is not limited to, profile information, category information, status information, or capability information. This collection of received information associated with each user, herein referred to as "participant data", provides the framework for interaction when a user participates in a session.

The term "profile information", as used herein, is meant to encompass descriptive information about the user to include information that is not specific to the types of interaction. This would include but is not limited to the user's name or public identifier, age, location from which they are connected, and a picture or graphic to display to represent that user.

The term "category information", as used herein, is meant to encompass information about the user to include information that is specific to how the user will use the interaction. This would include but is not limited to school information such as grade or major, job classification, or role associated with the particular interaction (participant, presenter, help desk, etc.).

The term "status information", as used herein, is meant to encompass information about the client or client device that shows event or state changes of interest to the presenter or others in that interactive session. For instance, whether the user has left a client device unattended and so is not available to accept interactive requests, whether the user has a pending question to ask the presenter, whether the user is currently in a chat with another participant, and the like.

The term "capability information", as used herein, is meant to encompass information about the client device and user to include information that is specific to how the user can interact with the presence server on a particular interaction session. For instance, if the user is dialed in or connected via a simple cell phone, then it would be voice only and no capabilities like graphics or chat would be available. However, if the user was connected via a personal computer with no microphone or camera, they would have graphical capabilities, could do chats, but could not send voice or video information. This also encompasses such things as available bandwidth.

The term "interaction session", as used herein, is meant to encompass the time when one or more persons are connected to a presence server for the purpose of a particular interaction, such as a meeting, discussion, seminar, or class.

The term "participant", as used herein, is meant to encompass a user who is part of an interaction session but is not in control of the information being presented to other users. Each participant is assigned a role at the time of the creation of the event if known in advance, or based on the URL the participant is given to join the event.

The profile, category, and capability information may be stored in media that includes database, text, files and the like, that are configured to maintain and store information associated with the user and interaction session. Moreover, the information stored may include how profile and category information may be viewed by another participant. For instance, it could be set so that personal information is stored (date of birth, personal identification number) but only viewable by persons with approval to do so by an administrator or the user.

Figure 3:
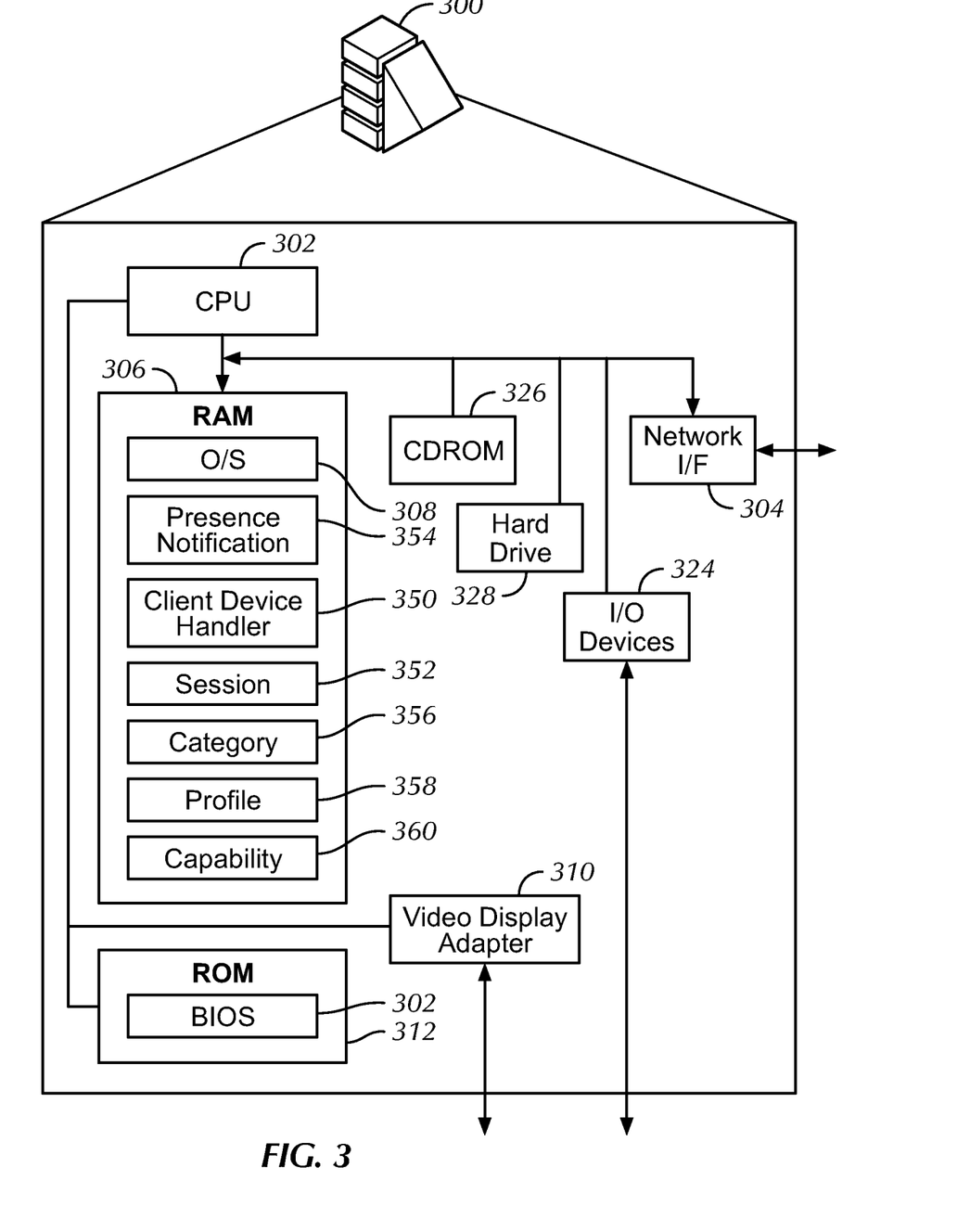
FIG. 3 illustrates the environment in which an embodiment of the participant-based multimedia can operate.

FIG. 3 shows one embodiment of the presence server 300. Although illustrated in FIG. 3 in distinct components, the client device handler 350, the session manager 352, presence notification manager 354, category store 356, profile store 358, and capability store 360 may be arranged, combined, and the like, in any of a variety of ways, with other components embodied on the client or the server, without departing from the scope of the present invention. For example, for some types of client devices that do support storage or client program execution beyond render a graphic and sending interaction inputs (such as from a touch screen, keyboard or mouse) to a server, the software that is said to be embodied on the server may be on the client, and may be arranged as part of the component herein identified as the presence notification manager 354.

The presence server 300 also may include input/output devices 324 for communicating with external devices, such as a mouse, keyboard, scanner, or other devices not shown in FIG. 3. The presence server may also include a video display adapter 310 to enable the interface of an external monitor. However, in one or more embodiments, for the execution of the programs necessary for the notification server to run, there is no need for direct human interaction on the server as the purpose of the server is to maintain a plurality of interactive sessions through presence requests and notification. Likewise, the presence server may further include additional mass storage facilities such as a CD-ROM/DVD-ROM drive 326 or hard disk drive 328. Hard disk drive 328 may be utilized to store, among other things, application programs, databases, client device handler 350, session manager 352, presence notification manager 354, category store 356, profile store 358, capability store 360, and the like. However, in other embodiments, the information may be stored on another form of persistence store such as a flash drive, read-only memory (ROM) 312, or network access storage (NAS) drives.

Computers generally run programs by stepping through a program or aggregate of programs called an operating system (O/S) 308. Parts of the O/S may run in random-access memory 306 and execute on a central processing unit (CPU) 302. Other parts may execute in ROM 312 with a stored Basic Input/Output System (BIOS) 302 stored in ROM to enable the computer to start. However, one or more embodiments a computer may include some or all of these components, such as a computer that runs only on software burned into ROM 312, using RAM 306 only for temporary data storage.

Figure 4:
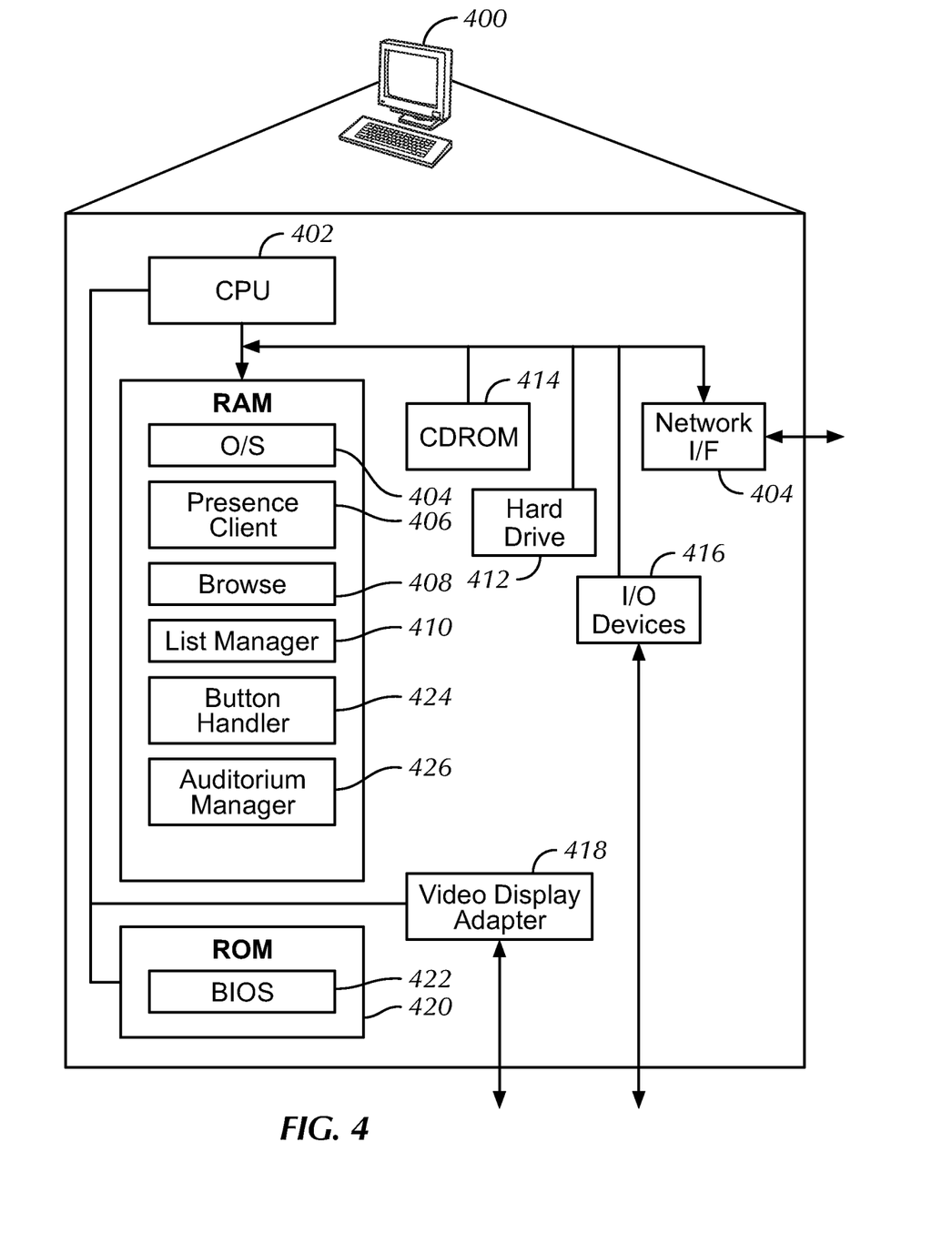
FIG. 4 illustrates one embodiment of a presence server.

FIG. 4 shows an embodiment of an internet-capable client device 400. One or more embodiments of the internet-capable device is a computing device consisting of a CPU 402 with RAM 404 and ROM 420. In one or more embodiments, the RAM 404 is loaded at startup with parts of the O/S 404 and the ROM 420 contains the Basic Input/Output System (BIOS) 422. In one or more embodiments, information may be stored on a Hard Drive 412, but information may also be stored on another form of persistent storage such as a CD-ROM/DVD-ROM drive 414, read-only memory 420, or one or more network access storage (NAS) drives. In one or more embodiments the client device will include a display as an integral part of the client device 400, which in one or more embodiments will need to interact with the processor through a video display adaptor 418. The client may interact with the client device through one or more Input/Output devices 416 such as a mouse, keyboard, webcam, microphone, and the like.

Although illustrated in FIG. 4 in distinct components, the presence client handler 406, the list manager 410, participant button handler 424, and auditorium view manager 426 may be arranged, combined, and the like, in any of a variety of ways, with other components embodied on the client or the server, without departing from the scope of the present invention. For example, for some types of client devices that do not support storage or client program execution beyond render a graphic and sending interaction inputs (such as from a touch screen, keyboard or mouse) to a server, the software that is said to be embodied on the client may be on the server, and may be arranged as part of the component herein identified as the presence notification manager 354 on FIG. 3.

In one or more embodiments, the presence client handler 406 acts as a coordinator to send requests to the presence server 300 to connect and notify the server of the client's attributes. The presence client handler 406 also receives requests from the presence server 300 containing information on other clients who join or leave the interactive session or change status, and then processes them locally to update the associated views.

In one or more embodiments, the list manager 410 will maintain the list of client devices. Each of the client devices and any user limitations such as the user being away is mapped to a known list of client device types and user types (or unknown). The characteristics associated with the interactive session that the particular client device has joined are stored on the server 300 as a "context" data structure. The list manager provides the characteristics of the limitations of interaction with each client device based on the characteristics of the device and the user.

In one or more embodiments, the participant button handler 424 will accept requests to modify the state of each tile either by size or by visibility.

In one or more embodiments, the auditorium view manager 426 will update the auditorium view based on the change in state of the participants in the interactive session, as indications are received that participants have joined, left, or otherwise changed state, such as changes in bandwidth, camera status, or privacy controls that the user has enabled or disabled.

The operation of certain aspects of one or more embodiments of the present invention will now be described with respect to FIG. 5-8.

In large gatherings, it is helpful to be able to view various elements of an interaction in a way that suits each participant and can be dynamically changed without losing track of what elements are present and who is present.

It is desirable to have a dynamic view of the participants and presentation materials which assume various roles. For instance, during a distance learning class, a student is listening to a lecturer describe a historical event which is unfolding on a video being shown. The student may wish to use most of the display to show the video and the lecturer and hide the audience view. However, at some point the student may have a question that a friend can answer privately, so he may hide the view of the lecturer and display the view of the participants. The multimedia presentation would still be visible but smaller. Once the question has been answered, the audience view can be hidden away again and the video can take up most of the display.

A user request to join a session is made via the URL link or the phone number the user is forwarded to the session manager 352 to define a new interactive session. In one embodiment, the interactive session may be defined as open to anyone or to a specific set of identified users. In another embodiment it may require that only some identified subset of users who have a profile in the profile store 358 may join the interactive session. In some manner, the users will be notified of the time and identifier associated with the interactive session. In one or more embodiments, the interactive sessions may be ad hoc, where one or more users may define the interactive sessions on the fly, other users may select from the interactive sessions available and request to join an interactive session. In one or more embodiments, the request may be able to define the interactive session as only available during a specific time period. Although in one or more embodiments the interactive session may be saved for future playback or annotation.

Once the interactive session has been established, users may make requests via their client device to join the interactive session via the presence notification server 354. If they are allowed to join based on the session parameters, the client device is added to the list of client devices associated with the interactive session. If the client device has the capability to receive data, the client device will be sent a notification list of all of the users currently connected to the session from the presence notification server 354. This notification list will include a list of users who were connected to the session when the client device joined and is stored in the presence client handler 406. For each user who is in the session, the profile, capability, status and category information based on the client device each user is using will be sent to the client device and the information is stored in the list manager 410.

In one or more embodiments whether or not the user is capable of receiving data may be determined by how they are connected. For instance, a client device which connects via a telephone network (Skype™, rotary phone, simple cell phone) would be detected as such by the server, and so having only voice capabilities would only be displayed as such to other users and would not be sent any information about other users directly. The system could only identify and describe that user by the identifier that user supplied or by the number they called in on, and so make use of any profile, capability, and category information stored on the presence server that call-in number or identifier supplied by the user. In another embodiment, such a user could use touch tone keys and voice to connect to a device such as an Interactive Voice Response and ask questions, have voice chats with other members of the audience, obtain information about the session such as what other users are connected and how, and the like.

Once a client device which can receive data and graphically display the data is connected and receives the list of current users, a view of the current participants is constructed on their display. This view, or tile, consists of one or more display objects. The user may then view the display objects, listen to and watch and incoming video/audio streams which are part of the display objects, and interact with the display objects based on the display object's characteristics.

In one or more embodiments, any time a client device joins the interactive session, leaves the interactive session by logging out or timing out, or changes its' status attributes (such as bandwidth, camera status or privacy controls), the presence notification manager 354 will send a notification to any client devices capable of receiving such a notification to its presence client handler 406, and the client device will update their view accordingly. In one or more embodiment, the presence notification manager 354 may allow this notification to occur on a timely configurable basis rather than instantaneously, to prevent the client device from being overwhelmed by frequent requests.

In one or more embodiments, the detection of the client device is done by having the client device log into an eXtendible Message and Presence Protocol (XMPP) server. In one or more embodiments, where the client device does not support the XMPP protocol, detection of the client device is done by having a client device handler send a request to the presence notification manager 354. The client device handler 350 would attempt to determine if there is any further information associated with the identifier in the profile 358, category 356, or capability 360 data stores. For instance, a user may be using a phone, but going through an IVR which enables the user to ask for information. Or a user may be in the capability as hearing disabled, so even though they are using a phone line it is via a TTY, and so they can respond to text and chat messages, but not voice questions.

Figure 5:
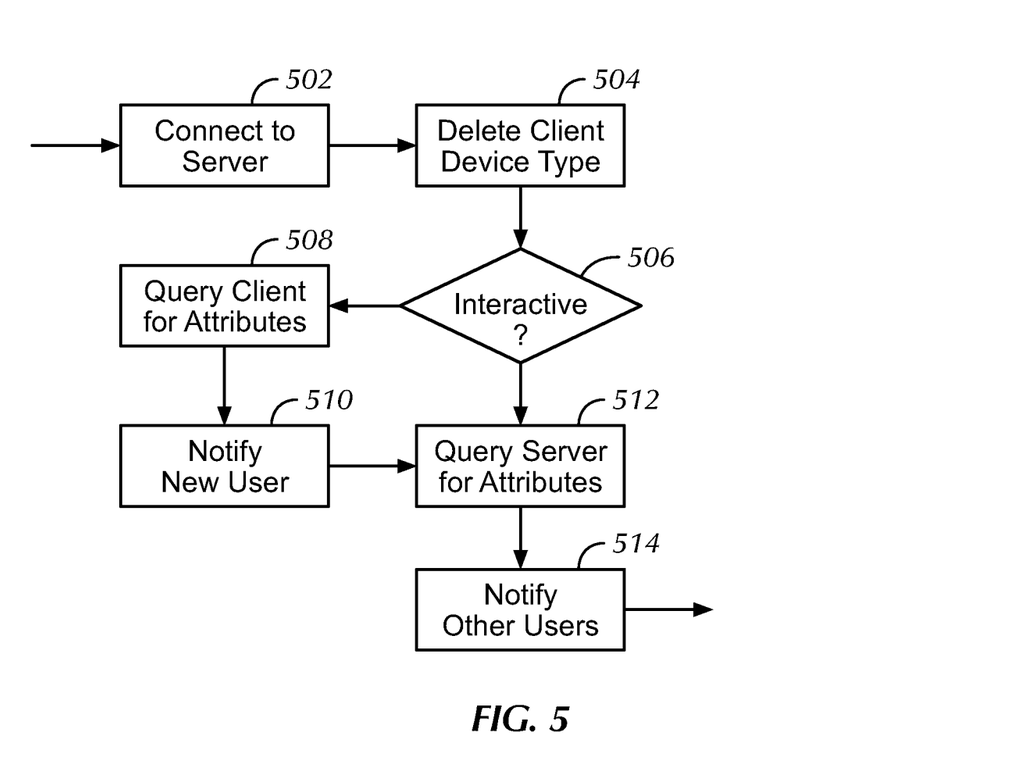
FIG. 5 illustrates one embodiment of a participant-base multimedia client.

FIG. 5 shows the process flow for one or more embodiments for a client device connecting to the presence server for a specific session. A client device sends a request for a connection to the server 502. In one or more embodiments, the request for a connection may be executed by a non-internet device by dialing into a specific phone number or through an IVR to select the session. In one or more embodiments, the request for a connection by a network-enabled device may be executed by having the client presence handler 406 send a message to the presence server, the message configured to request a connection to a specific session. Once the device is connected, the type of client device is detected on the presence server 504 and the type determined by the presence client handler 406. In one or more embodiments, the client device handler 350 can infer the type of device by the way the client device connected to the server, such as through a telephony connection. In one or more embodiments, the client device handler 350 may query a network-enabled device for information associated with the user and client device, or receive that information as part of the connection request. By a network-enabled device, we are talking about a device which can report network-associated characteristics such as its bandwidth or network link status. In one or more embodiments, if the client device handler 350 determines the type of connection is interactive 506, the client device may be queried by the client device handler 350 for more attributes such as bandwidth, camera status, and privacy controls 508. If the client device is interactive and capable of storing information, the client device will be notified by the presence notification manager 354 of the current list of users and their attributes 510, this information stored locally on the client device in the list manager 410. In one or more embodiments, if the device is not interactive, one or more data stores on the server will be queried to see if it has attributes associated with the client device and/or user associated with that client device 512. If it does not, it is treated as a default unidentified device type with an associated set of characteristics. A notification message is then sent to other client devices via the presence notification manager 354 consisting of at least the new user's identification information and attributes 514.

Figure 6:
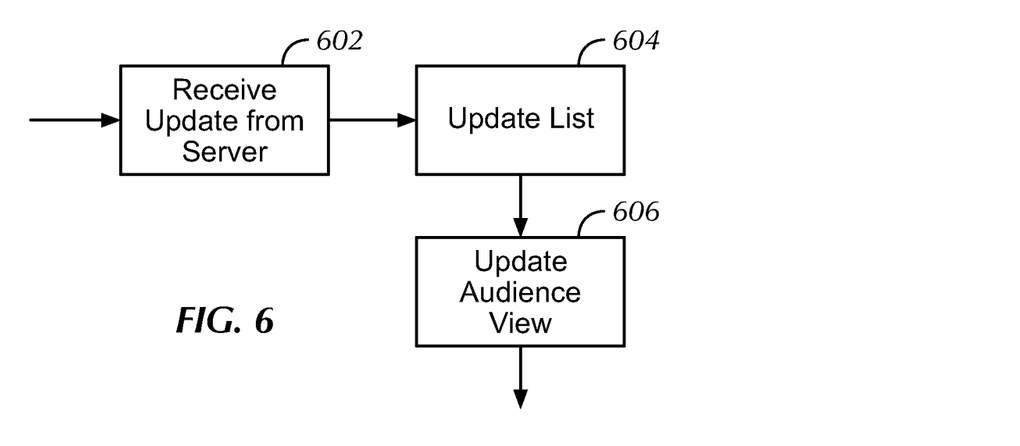
FIG. 6 illustrates an embodiment of the participant-based multimedia display.

FIG. 6 shows an embodiment of the flow which occurs on an embodiment of a client device when it receives an update from the server. On receipt of an update indicating the addition or removal of one or more client devices 602 the list manager 410 updates the list 604. In one or more embodiments, this could include an algorithm to sort or filter the entries based on one or more attribute of the client device. The auditorium manager 426 updates the audience view to reflect the change 606. In one or more embodiments, the step of updating the audience view may occur immediately, or if the may occur after some period of time to prevent thrashing, or may occur only if and when the view is visible to the client.

Figure 7:
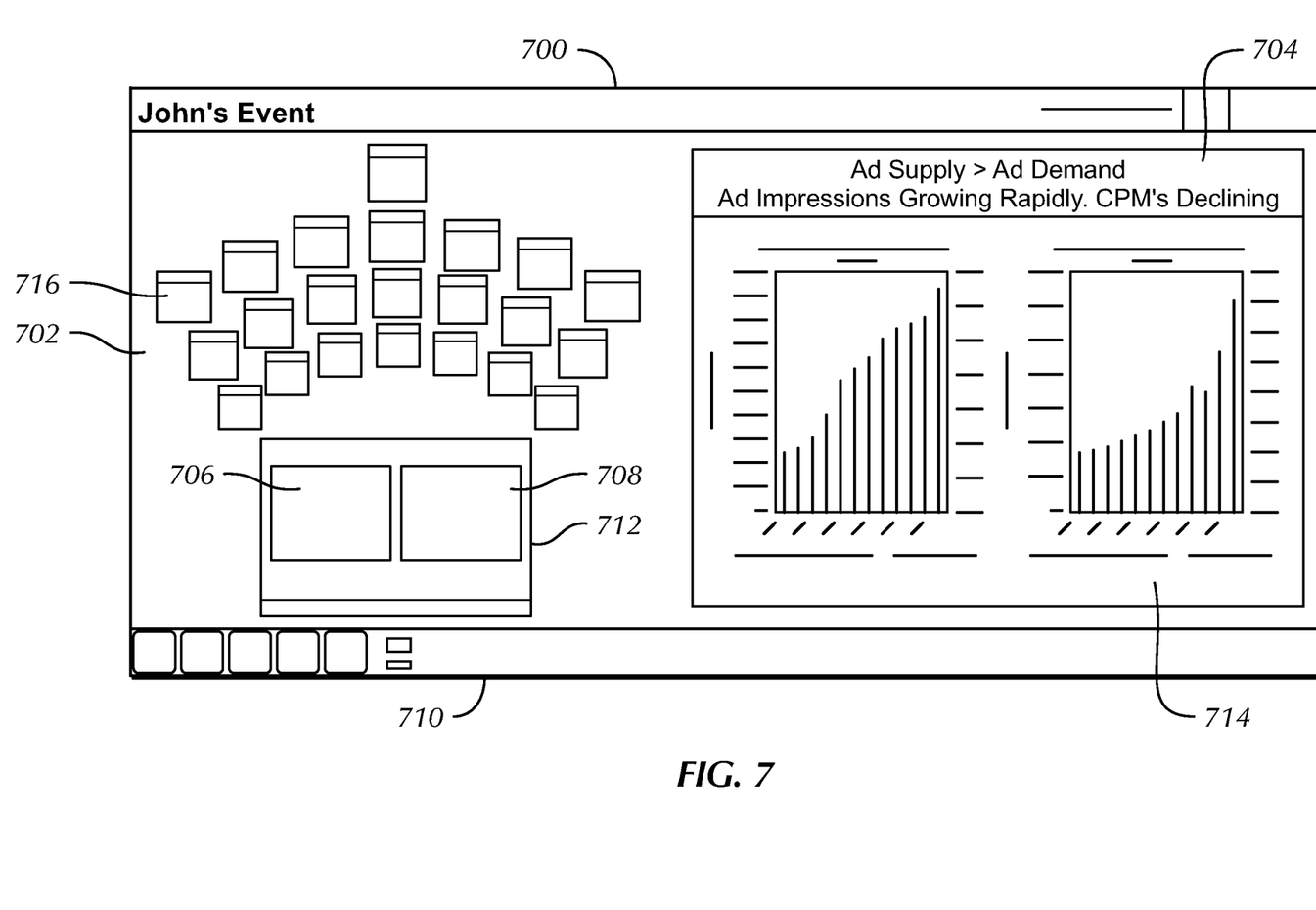
FIG. 7 illustrates the initial setup for one embodiment of an auditorium view with one row.

FIG. 7 shows an embodiment of an interactive display 700. The display consists of 3 tiles. The first tile 702 shows everyone who is connected as a participant 716. The second tile 712 contains the host 706 and any participant he or she invites to have a public discussion with him/her 708. The third tile 714 contains a multimedia presentation being sent from the presenter 704. One can create a multitude of tiles based on a set of rules around the roles and tasks performed by the persons associated with the client devices. These rules define the visual layout of tiles and could either be fixed for the session or dependent on the state of a session. In one or more embodiments, you can have a tile for assistants to the presenter to answer logistical questions posed by participants.

In one or more embodiments, using controls on the display 710, one can hide or show each of the tiles. In one or more embodiments, the sizing of the tiles may be done by controls on the tiles themselves; then, when the tiles are hidden and redisplayed, the size is based on the display available and the size setting last selected. In other embodiments, it may be done by controls on the overall display.

In one or more embodiments, a display consists of one or more regions which represent collections of types of real objects. These regions, or tiles, may include one or more display objects that represent types of participants (groups, individuals, speakers, guides, etc.), or types of interactions (chat, multimedia).

In one or more embodiments, each tile is a displayed as a rectangular region and is initially placed on the screen in a location on a fixed grid. The location and the grid size is defined by the designer via a set of CSS-like layout configuration statements which are associated with the display definition. Each tile is always anchored to its' grid cell at design time and initially assumes some size relative to the screen. In an individual users display, the tile may be selected to be resized, either to some maximum or minimum size. The minimum size is set at design time in the configuration for each tile. The maximum is also set at design time, but is limited either to the space available or the maximum set value whichever is bigger.

Tiles may be allowed to overlap in a manner selectable by the user. In one or more embodiments, a tile may be expanded to fill the space in a grid in the horizontal and vertical directions, up to the border of another visible tile. The expansion process of each tile is configurable. The expansion process can be defined as horizontal only, vertical only, first horizontal then vertical or first vertical then horizontal. The goal is to fill as much space as possible on a request to expand while maintaining the desired characteristics of the tile.

In one or more embodiments, each object type within the tile has a specific response on select or double-click. In one or more embodiments, selecting an object will make the sizing handles visible and a double click could select an interaction with the object. In one or more embodiments, double clicking on the speaker by a participant could open a question window, double clicking on a participant by the speaker could move the participant into the speaker box so they can have a public conversation. In another embodiment, double clicking on a participant or presenter could cause a popup menu to be displayed presenting multiple options to select from.

Each participant box could show specific state information such as bandwidth, camera status and privacy controls to a specific participant. For instance, a small graphic could be shown on or next to a specific participant to show that the participant is in a chat or has had a chat with that participant in the recent past.

As a participant chooses to leave or enter the interaction, the audience display will adjust. It does this by changing the size and location of each participant. In one embodiment, the ordering of the participants is based on time of entry. In another embodiment, they may be sorted based on some attribute specific to them such as time/date or registration, personal characteristic such as last name, or some characteristic assigned to them by the speaker. In one or more embodiments, this adjustment will occur on a periodic basis to prevent overload of the user device or confusion on the part of the user caused by constant shuffling of the display.

In one or more embodiments, the participant may have the ability to dynamically reorder or filter the audience participants. For instance, in one embodiment there may be hundreds of people attending a presentation, but a participant only wants to view people whom he shares some attribute such as all working for the same company, same department, or same study group.

To allow a user of a client device to focus on a specific portion of the display and/or presentation, one or more embodiments would enable a user to hide or show each tile.

Figure 8:
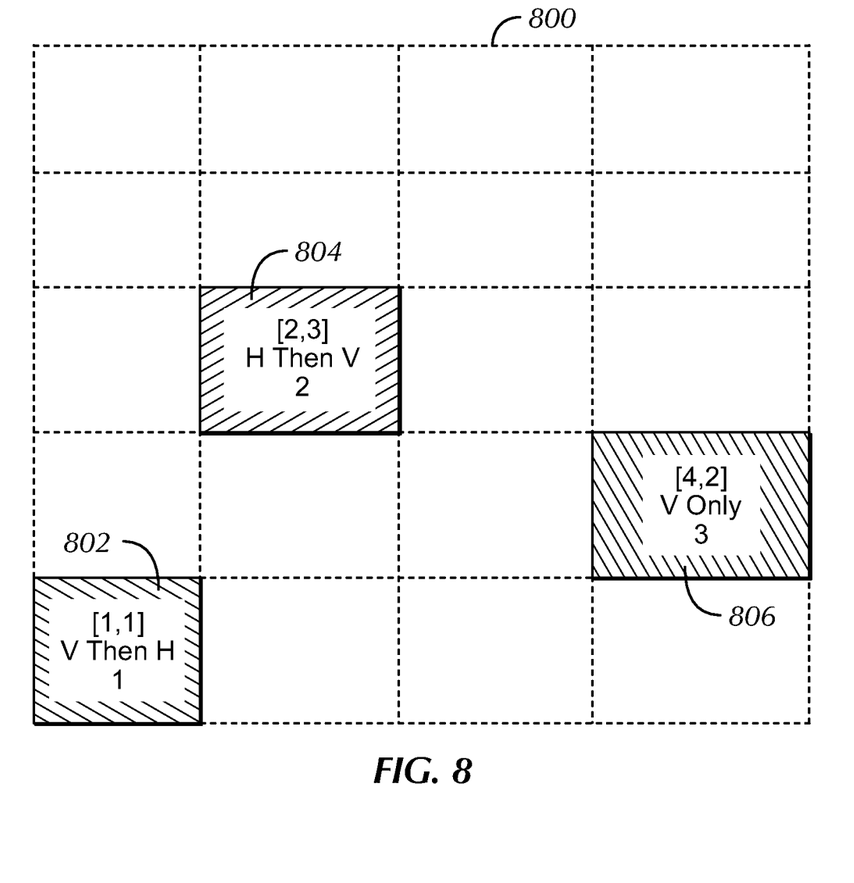
FIG. 8 illustrates the initial setup for one embodiment of an auditorium view with two rows.
Figure 9:
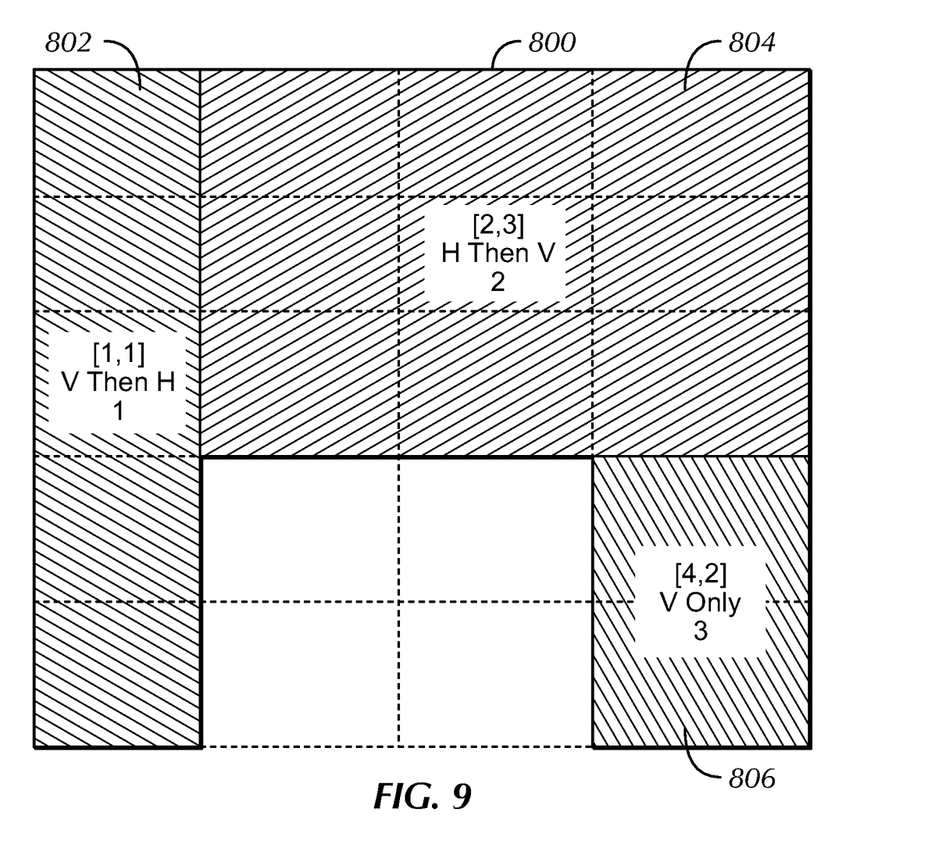
FIG. 9 illustrates an embodiment of the flow which occurs on the client device when the client device receives a notification that another client device joins or leaves the interactive session.
Figure 10:
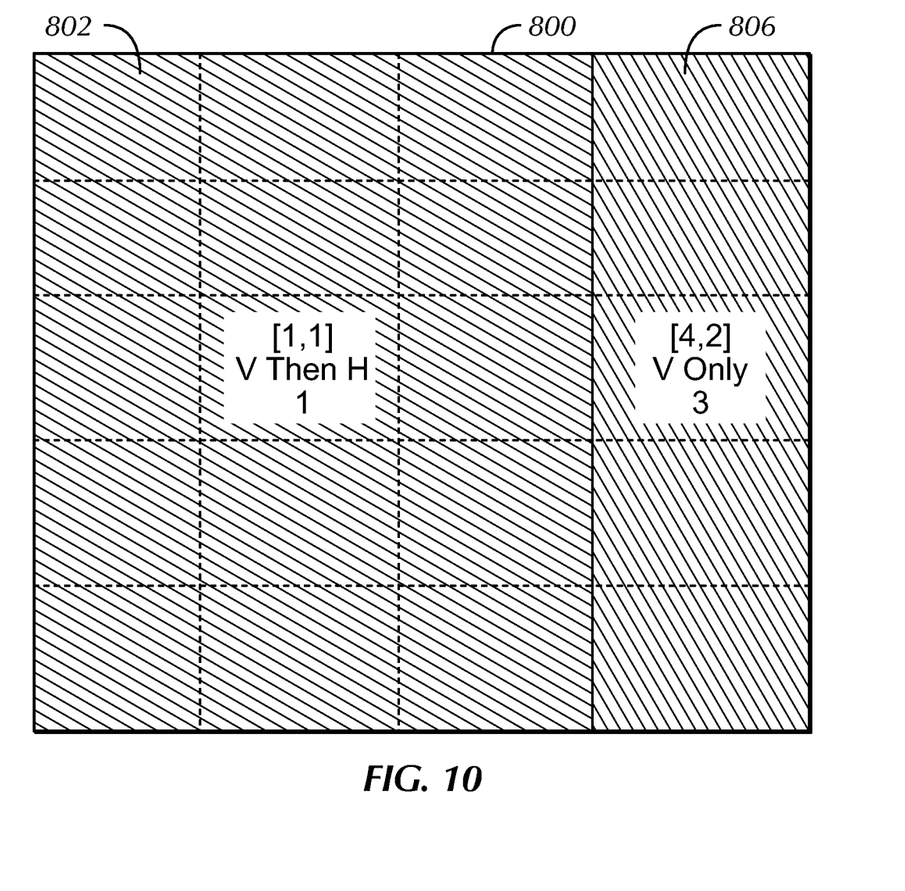
FIG. 10 illustrates an embodiment of a configurable client device display with three tiles at startup. A tile is a rectangular region displayed to a participant, where the view of the session on the client device consists of one or more tiles.

One embodiment of the tiling is shown in FIGS. 8-10. In one scenario as shown in FIG. 8, we have three tiles 802-806 defined on a 4×4 grid 800. Each tile has a home cell in the grid. FIG. 8 shows the initial positions of the three tiles. An order has been defined for the rendering of each tile when visible. The tile whose home is at [1,1] 802 is defined to be the first to be resized, and is further defined to be stretched vertically then horizontally. The tile whose home is at [2,3] 804 is defined to be the second to be resized, and is further defined to be stretched horizontally then vertically. The tile whose home is at [4,2] 806 is further defined to be stretched vertically only.

FIG. 9 shows what happens when all three tiles are allowed to fill their max settings. The first tile 802 stretches vertically but cannot stretch horizontally because of the second tile 804. The second tile 804 stretches through its row into cells [2,3] and [2,4], and cannot fill [2,1] because of the presence of the first tile 802. The second tile then fills the space upward but cannot go down because of the presence of the third tile 806. The third tile 806 then can only stretch vertically but in any case is only configured to do so. In one or more embodiments, the tiles may also have min/max settings configured at design time so that each tile may not be able to stretch to cover all of the space available.

FIG. 10 shows what happens when the second tile is hidden. The first tile 802 already fills vertically in the grid 800, but will take over the horizontal space vacated by the second tile 804 which had been hidden from view by the user. The first tile 802 will not fill the last column because of the presence of the third tile 806. The third tile 806 then goes next, to expand vertically to fill the entire column.

Figure 11:
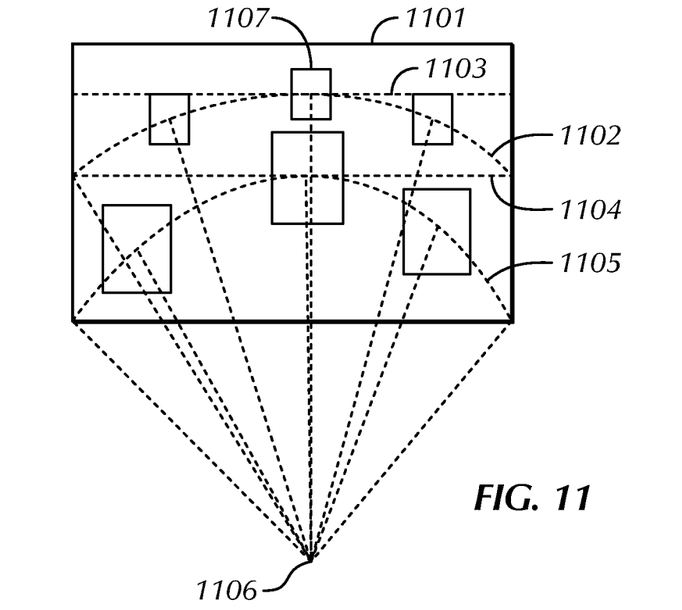
FIG. 11 illustrates an embodiment of a configurable client device display with three tiles after startup has completed.

As shown in FIG. 11, participants, each of which represents one or more persons interacting with the presentation through a single computer, are displayed as an audience object 1107 within the audience block 1101. In one or more embodiments, the audience block 1101 is displayed as a plurality of arched rows 1105, with the audience objects 1107 in each row getting smaller to simulate perspective.

The area of the audience block is defined as a set of one or more rows. Each row is delineated by a line through the block 1103, 1104. The goal is to display the users in an arc, as one would see in an audience or lecture hall. The distance from the bottom of the block to the first line is some percent larger than the distance from the first line to the second line and so on. In one embodiment this would be 10%. So the distance to the first line would be (100/(1+1.1))*1.1 or 52.4% of the vertical size of the block, and the remaining distance would be 47.6% of the vertical size of the block. Some distance from the center of the bottom of the block some imaginary vertex is defined. This distance is chosen so that the angle arc from the ends of the bottom line produces a curve which will touch the first line but not cross it.

The size of the audience object in each row is chosen so that the one in the center will not go outside the audience block while its center point is over the point where the arc meets the line. For instance, the above example where there is one row, the height of the audience object would be 95.2% of the height of the block, based on having the center point on the line which is 47.6% of the distance from the top of the block.

The width of the audience object in each row would be chosen based on its position relative to the next one, allowing some configured gap in pixels between them. The angle created by the lines from the bottom edge of the block to the imaginary point is split into one more part than there are audience objects. If there is only one audience object, its' center is placed at the intersection of the angle bisector and the line. If there are two, the angle is split into three and the two blocks are placed on each inner line where it meets the arc drawn from each end point. And so on, until the width of each block is reduced below some configured size or they would touch, then a second row is added.

If the size of the audience block 1101 is changed at the client display, then the number of rows would adjust accordingly.

Selecting a single participant in the audience view expands the view so that more information associated with the participant is visible. In one or more embodiment, this information will include information about the profile, category, and capabilities of the participant. For example, it could display graphics to show whether or not this participant has a voice capabilities, video capabilities, is on a mobile device, and the like.

Figure 12:
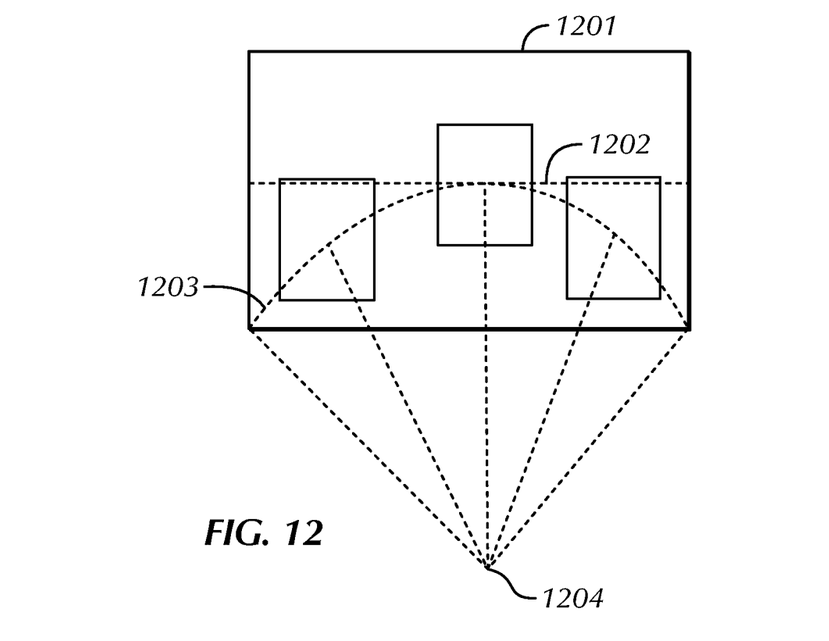
FIG. 12 illustrates an embodiment of a configurable client device display with three tiles after a user has commanded the client device to hide one of the three tiles.

FIG. 12 shows one embodiment of the generation of the audience view for the first row of users. A line 1202 is drawn through the audience tile 1201 such that the distance below the line is some fraction larger than the distance above the line. A point is selected directly below the center of the audience tile 1204 and an arc 1203 is constructed from the point through the audience tile such that the ends of the arc touch the bottom corners of the audience tile 1201 and the center of the line 702. The objects representing the participants 1205 are then added such that the center of the object is at the intersection of a ray coming from the point 1204 and the arc 1203. In one or more embodiments, the rays are constructed around an odd number of participants. So for the first participant, one ray is constructed in the center of the arc. For the next participant, two rays are constructed bisecting each half of the arc. If there is room for four more participants, each of the four arcs are bisected, and so on.

As shown in FIG. 11, once the first row is full a second line 1103 is created between first line 1104 and the top of the tile 1101 such that the distance from the first line to the second line is fractionally larger than the distance from the second line to the top of the tile. The size of each participant object is reduced to make room, but each of the participant objects in the first row are larger than the ones in the second row. In one or more embodiments, the arc defining the second row 1102 goes from the ends of the first line 1104 to the center of the second line 1103.

In one or more embodiments, programming instructions for executing above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C #, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

The invention claimed is:

1. A conferencing device, comprising:
   at least one display;
   at least one processor coupled to the display;
   at least one memory unit coupled to the at least one processor, the memory unit storing instructions, the instructions comprising instructions executable by the processor to cause the processor to:
   participate in a conference with one or more client-devices;
   receive a list of currently participating client-devices;
   receive data corresponding to a plurality display objects, wherein one or more of plurality of display objects corresponds to a participating client-device; and
   display, based at least in part on the received data, a view on the display, the view including one or more of the display objects, wherein:
   each display object from amongst the plurality of display objects corresponds to a client-device;
   a first portion of the plurality of the display objects are arranged in a first arched row;
   a second portion of the plurality of display objects are arranged in one or more successive arched rows;
   each successive arched row's width is determined as a function of an immediately preceding arched row's width;
   each successive arched row's width is used to determine an angle associated with the arched row; and
   placement of one or more display objects relative at least one other display object is based, at least in part, on a time of entry into the conference by each of the listed participating client-devices.

2. The conferencing device of claim 1, wherein the instructions further comprise instructions to:
   receive a notification that a client-device has joined the conference, left the conference, or changed its status attributes during a first time period; and
   update the view according to the notification received from the client-device during a second time period.

3. The conferencing device of claim 2, wherein the instructions further comprise instructions to update, upon receiving the notification during the first time period, the view by changing at least one of size and location of display objects corresponding to the client-devices during the second time period.

4. The conferencing device of claim 1, wherein the instructions to display the view further comprise instructions to display a first tile showing currently participating client-devices, a second tile showing a host and any client-device the host invites to engage in public discussion, and a third tile showing a presentation received from at least one client-device.

5. The conferencing device of claim 4, wherein the instructions further comprise instructions to resize or reposition one or more of the tiles, responsive to a user input.

6. The conferencing device of claim 4, wherein the instructions further comprise instructions to resize or reposition one or more display objects within one or more of the tiles, responsive to a user input.

7. The conferencing device of claim 4, wherein the instructions to display the view further comprise instructions to display a fourth tile corresponding to at least one client-device of an assistant to the host.

8. The conferencing device of claim 1, wherein the instructions to display the view further comprise instructions to:
display a first tile showing each participating client-device, wherein a display object associated with each participating client-device shows state information corresponding to such client-device.

9. The conferencing device of claim 1, wherein:
the instructions further comprise instructions to filter, responsive to a user input, display objects associated with one or more of the participating client-devices; and
the instructions to display the view further comprise instructions to display only those display objects which have not been filtered.

10. A non-transitory computer readable medium storing instructions, the instructions comprising instructions executable by at least one processor to control a conferencing device to:
participate in a conference with one or more client-devices;
receive a list of currently participating client-devices;
receive data corresponding to a plurality display objects, wherein one or more of plurality of display objects corresponds to a participating client-device; and
display, based at least in part on the received data, a view on a display, the view including one or more of the display objects, wherein:
each display object from amongst the plurality of display objects corresponds to a client-device;
a first portion of the plurality of the display objects are arranged in a first arched row;
a second portion of the plurality of display objects are arranged in one or more successive arched rows;
each successive arched row's width is determined as a function of an immediately preceding arched row's width;
each successive arched row's width is used to determine an angle associated with the arched row; and
placement of one or more display objects relative at least one other display object is based, at least in part, on a time of entry into the conference by each of the listed participating client-devices.

11. The non-transitory computer readable medium of claim 10, wherein the instructions further comprise instructions to:
receive a notification that a client-device has joined the conference, left the conference, or changed its status attributes during a first time period; and
update the view according to the notification received from the client-device during a second time period.

12. The non-transitory computer readable medium of claim 11, wherein the instructions further comprise instructions to update, upon receiving the notification during the first time period, the view by changing at least one of size and location of display objects corresponding to the client-devices during the second time period.

13. The non-transitory computer readable medium of claim 10, wherein the instructions to display the view further comprise instructions to display a first tile showing currently participating client-devices, a second tile showing a host and any client-device the host invites to engage in public discussion, and a third tile showing a presentation received from at least one client-device.

14. The non-transitory computer readable medium of claim 13, wherein the instructions to display the view further comprise instructions to resize or reposition one or more of the tiles, responsive to a user input.

15. The non-transitory computer readable medium of claim 13, wherein the instructions to display the view further comprise instructions to resize or reposition one or more display objects within one or more of the tiles, responsive to a user input.

16. The non-transitory computer readable medium of claim 13, wherein the instructions to display the view further comprise instructions to display a fourth tile corresponding to at least one client-device of an assistant to the host.

17. The non-transitory computer readable medium of claim 10, wherein the instructions to display the view further comprise instructions to:
display a first tile showing each participating client-device, wherein a display object associated with each participating client-device shows state information corresponding to such client-device.

18. The non-transitory computer readable medium of claim 10, wherein:
the instructions further comprise instructions to filter, responsive to a user input, display objects associated with one or more of the participating client-devices; and
the instructions to display the view further comprise instructions to display only those display objects which have not been filtered.

* * * * *